United States Patent [19]

Tabler

[11] 4,152,385
[45] May 1, 1979

[54] SIDE PAPER CLAMPING FOR CONTINUOUS FOAM SHEET PRODUCTION

[76] Inventor: Charles P. Tabler, 2435 Sir Martin Dr., Hamilton, Ohio 45013

[21] Appl. No.: 867,330

[22] Filed: Jan. 5, 1978

[51] Int. Cl.² .............................................. B29D 27/04
[52] U.S. Cl. ................... 264/46.2; 264/46.6; 264/51; 264/216; 264/DIG. 84; 425/451.9; 425/817 C
[58] Field of Search ............ 264/45.8, 46.6, DIG. 84, 264/46.2, 216, 51; 425/451.9, 817 C

[56] References Cited

U.S. PATENT DOCUMENTS

| | | | |
|---|---|---|---|
| 3,093,232 | 6/1963 | Kornylak | 264/45.8 X |
| 3,249,486 | 5/1966 | Voisinet et al. | 264/DIG. 84 |
| 3,734,668 | 5/1973 | Porter | 264/DIG. 84 |
| 3,812,227 | 5/1974 | Blackwell et al. | 264/DIG. 84 |
| 3,943,215 | 3/1976 | Grüne et al. | 264/46.6 |
| 4,046,611 | 9/1977 | Sanson | 264/46.6 X |

*Primary Examiner*—Philip Anderson
*Attorney, Agent, or Firm*—Thomas E. Beall, Jr.

[57] ABSTRACT

Two opposed endless conveyor belts, together with side dams respectively mounted on the conveyor belts form a molding tunnel for producing a continuous sheet of foamed and cured resin. A cover sheet, usually of paper, is provided between the molding surfaces of the side dams and conveyors and the product being formed. The side dams are movable toward and away from an abutting surface of the conveyor opposite to the one that they are mounted on so as to clamp the paper therebetween and prevent leakage of foam. A mechanism, particularly a spring bias and cam track, is provided to release the paper clamping pressure to permit the foaming resin briefly to permit the expanding resin to move the paper into conformity with the molding tunnel. The points along the length of the molding tunnel wherein this release occurs are adjustable as desired.

6 Claims, 4 Drawing Figures

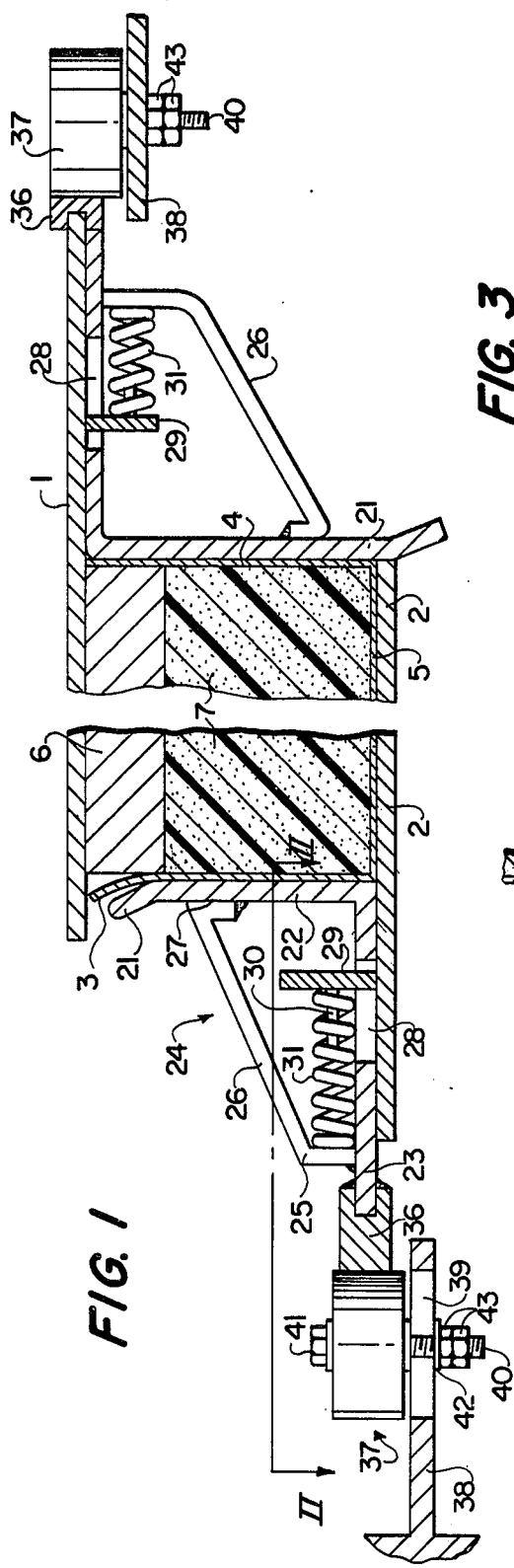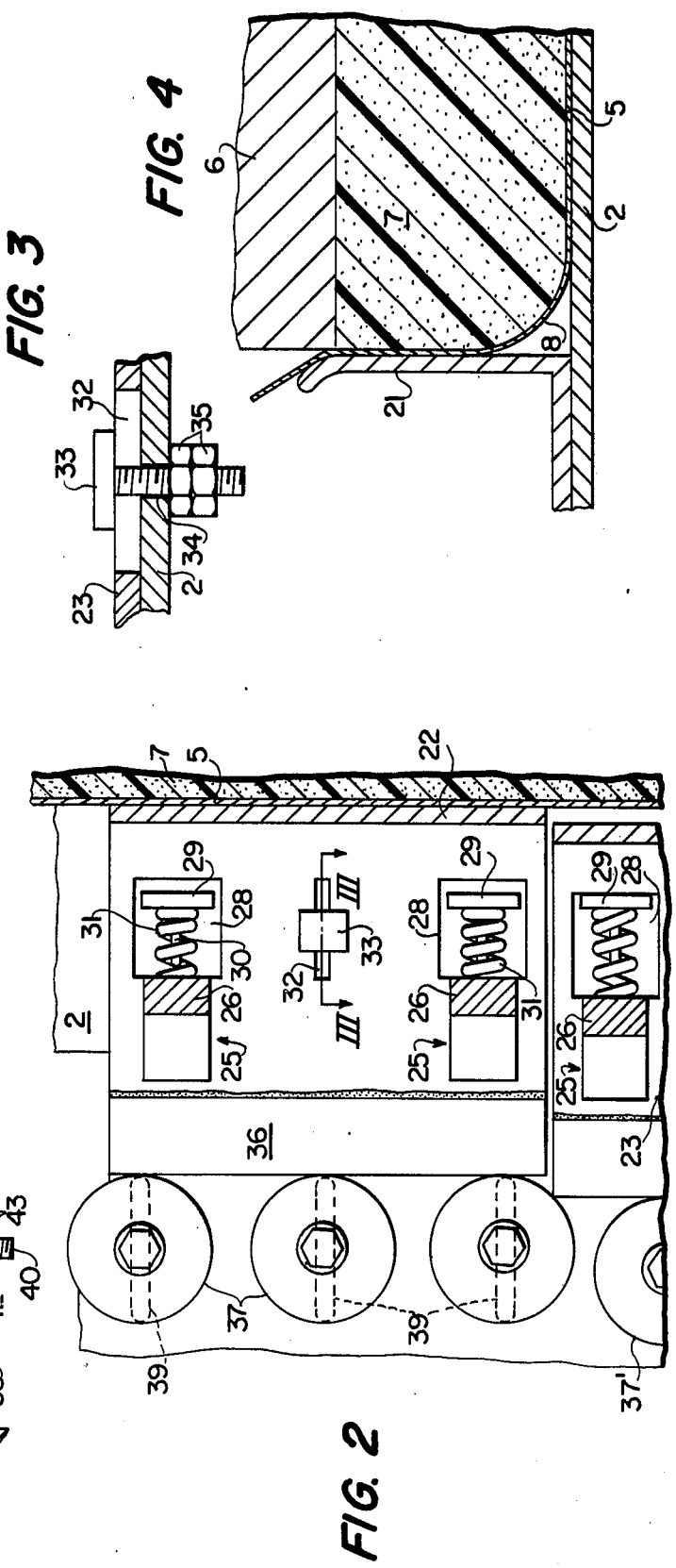

SIDE PAPER CLAMPING FOR CONTINUOUS FOAM SHEET PRODUCTION

BACKGROUND OF THE INVENTION

The present invention relates to the continuous production of foamed and cured synthetic resin sheets that may be usable for sheet insulation, prefabricated walls, mattresses, packing material, or many other uses wherein a foam resin, either rigid or resilient, is desired. Covered sheets of paper, particularly Kraft paper, are used to protect the side dams and endless conveyors of the molding tunnel from contact with the resin during its foaming and curing, and in such conventional devices there is the problem that with clamping of the paper so as to prevent leakage past the paper, such clamping is accomplished before the foaming process is ended so that there will be either excess paper within the molding tunnel to produce wrinkles or insufficient paper within the molding tunnel to produce rounded corners, and if clamping is delayed there can be considerable leakage to foul the apparatus.

SUMMARY OF THE INVENTION

It is an object of the present invention to reliably clamp the cover paper of a molding pressure tunnel, comprising opposed endless belts and side dams that leakage will not occur while at the same time assuring that the correct amount of paper will be present within the molding tunnel so as to prevent wrinkles or rounded corners.

According to the present invention, the side dams are mounted so as to be laterally movable with respect to the conveyors, and more particularly they are biased away from engagement with the conveyor opposite the one that they are mounted on and forced into engagement by an adjustable cam track that will control the points of clamping engagement and release of the paper so that the paper may be clamped to prevent leakage of expanding foam and released where the paper exists from the molding tunnel, respectively. Periodically, the paper may be briefly unclamped, as many times as necessary, to permit feeding of more paper within the molding tunnel by the forces of the expanding resin so as to assure the proper amount of paper within the molding tunnel to prevent rounded corners. The unclamping is only to a minor extent sufficient to permit movement of the paper into the molding tunnel, which movement of the paper into the molding tunnel will tend to sweep away the expanding foam and prevent leakage during this small period of unclamping, and the paper is reclamped quickly to prevent any leakage.

The cam mechanism particularly employs a flight of rollers mounted on normally stationary axes that may be adjusted towards and away from the molding tunnel to precisely provide the points of clamping and unclamping along the length of the molding tunnel within the rise zone of the molding tunnel, and a follower rail mounted on the adjacent side dam. The side dams are provided with a lost motion connection with one of the conveyors, which connection includes a bias of the side dam in the form of a compression spring away from the molding tunnel.

BRIEF DESCRIPTION OF THE DRAWINGS

Further objects, features and advantages of the present invention will become more clear from the following detailed description of a preferred embodiment, as shown in the accompanying drawing, wherein:

FIG. 1 is an elevation cross section view of the molding tunnel and side dam clamping mechanism of the present invention, taken on a vertical plan extending perpendicular to the direction of conveying within the tunnel;

FIG. 2 is a partial cross sectional view taken along line II—II of FIG. 1;

FIG. 3 is a partial cross sectional view taken along line III—III of FIG. 2; and FIG. 4 is a cross sectional view similar to a portion of FIG. 1 and showing insufficient paper within the molding tunnel.

DETAILED DESCRIPTION

In the present invention, a new product is continuously molded in a moving pressure tunnel formed between opposed endless belts and side dams, which side dams are movable towards and away from the endless belts to respectively clamp and release a cover paper or release paper. The basic molding apparatus is preferably that of U.S. Pat. No. 3,994,648 issued to Andrew T. Kornylak and Charles P. Tabler on Nov. 3, 1976. In this patent, there are opposed endless conveyor belts 1 and 2 and side dams or side walls 21. All of the structure shown and described in U.S. Pat. No. 3,994,648 is incorporated herein by reference as a part of the present invention, with the only modification of such patented structure being in the mounting and side shifting of the side walls or dams, which is specifically shown in the present FIGS. 1–4. Further details of the conveyor belts are shown in the U.S. Pat. Nos. 3,914,084, issued Oct. 21, 1975 to Andrew T. Kornylak; 3,082,861 issued Mar. 26, 1963 to Kornylak; and 2,746,595 issued May 22, 1956 to Andrew T. Kornylak. The disclosure of these patents is also incorporated herein with respect to their teachings of how to make and use the apparatus of the present invention.

The endless conveyor belts 1 and 2 have adjacent runs moving generally horizontally and in the same direction so as to form a molding pressure tunnel as shown in FIG. 1 together with the side walls 21. As shown in FIG. 1, the left-hand side wall is mounted on and carried along for movement with the conveyor 2, whereas the right-hand side wall 21 is mounted on and carried along for movement with the conveyor belt 1. A continuous sheet of, preferably Kraft, paper is fed into the entrance end of the molding tunnel, as is known and disclosed in some of the abovementioned patents, to line the bottom conveyor 2 and side walls 21 within the molding tunnel, with such paper assuming an upwardly opening trough shape as shown in FIG. 1, with a left-hand leg 3 lining the left-hand side wall 21, a right-hand leg 4 lining the right-hand side wall 21, and a web portion 5 lining the lower conveyor 2. The upper conveyor 1 includes a downwardly depending plug portion 6, which, if desired, may be covered by a similar separate sheet of Kraft paper (not shown). The two side walls 21 engage the plug 6 so as to clamp the outer ends of the legs 3 and 4 of the paper against the plug 6, to prevent leakage of the material 7 being molded.

The scope of the present invention includes various modifications according to its broader aspect. For example, instead of Kraft paper, a thin film or sheet of synthetic resin may be employed. The sheet of resin or paper may be either retained on the final product or stripped from the product after curing when it is removed from the mold. While the plug 6 facilitates clamping of the right-hand leg 4 of the paper, the plug 6 may be eliminated so that there will be no clamping of the right-hand leg 4 of the paper; at the same time, the left-hand edge of the conveyor 1 and the left-hand side wall 21 may be constructed so as to overlap as shown in U.S. Pat. No. 3,994,648 to clamp therebetween the leg 3 of the paper. In this modification and in others, it may be desirable to employ only one movable side wall 21, and rigidly secure the other side wall 21 to its respective conveyor. Further, it is contemplated that the side walls may be both mounted on the same conveyor, for example, the right-hand side wall 21 may be mounted on the conveyor 2 so as to be a mirror image of the left-hand side wall, both with their actuating mechanism to be described below, with a plan of symmetry for the molding tunnel being a central vertical plane perpendicular to the plane of FIG. 1. Further, since the conveyors 1 and 2 are preferably constructed of rigid metal slats having a length, in the conveying direction perpendicular to the plane of FIG. 1, of between 6 and 12 inches, it is recognized that according to the above-mentioned patents there is a small gap between such plates; to cover these gaps, each of the belts 1 and 2 within the molding zone, may be covered by additional endless belts 9 and 10 as shown in U.S. Pat. No. 3,994,648, and in such case the cover belt for conveyor 2 would be between conveyor 2 and the web 5.

According to the above-mentioned patents, it is recognized that the mixture to be foamed is layed on the web 5 of the paper adjacent the entrance to the molding tunnel, the molding tunnel is closed by the top belt 1 approaching the bottom belt 2, and the paper is clamped. The deposited material quickly foams and expands as shown at 7 in FIG. 1 to fill the mold cavity. With this expansion, it is conventional to reach pressures of 3 to 5 psi within the molding tunnel during foaming and subsequent curing, particularly when employing foamed polyurethane, as an example. These pressures are quite considerable and it is necessary to tightly clamp the paper to prevent any leakage. The prevention of leakage is important since this type of material can easily build up and foul the apparatus if allowed outside of the molding tunnel. After the foam sheet 7 is cured, the conveyors 1 and 2 move away from each other at the exit end of the molding tunnel, as is conventionally shown in the above-mentioned patents, and thereafter the continuously exiting cured foamed sheet is cut to convenient lengths and removed.

In FIG. 1, the width of the molding tunnel, as measured in the horizontal direction between side walls 21 may be any desired length, but is usually 3 to 8 feet, whereas the height of the molding tunnel, as measured vertically between conveyor 2 and plug 6 in FIG. 1, is usually between less than 1 inch and a few feet. It is therefore seen that quite a large sheet of paper 3-5 is employed. The required amount of paper to form a rectangular cross section is properly shown in FIG. 1. However, problems have developed in the prior art with respect to either providing more or less than the required amount of paper to exactly line the appropriate walls of the rectangular cross section of the product. If too much paper is clamped within the molding tunnel, seams, wrinkles, and other deformities will be formed in the outer surface of the product, whereas if too little paper is clamped within the molding tunnel, the paper will prevent the foam from fully expanding into the corners of the molding tunnel, particularly as shown in FIG. 4. As shown in FIG. 4, a result of providing insufficient paper is that the foam, despite its high pressure, cannot completely fill the corner 8 and therefore rounded corners of the product will be produced. When the product has these mentioned defects, they are either tolerated as undesirable or the product is discarded or sides of the product are trimmed to remove the rounded corners and square the cross section, or the lower surface of the product is sliced to remove the seams. In any event, it is most desirable to produce a product with smooth walls conforming to the molding tunnel as defined by the plug 6, conveyor 2, and side walls 21.

This desired result is obtained with the present invention by overcoming the above-mentioned disadvantages, and particularly employing the following preferred structure.

It is most preferred to mount the side walls on one side of the molding tunnel on one conveyor and mount the side walls of the other side of the molding tunnel on the other conveyor, so that the conveyors 1 and 2 may be similarly constructed, when it is noted that, for example, the structure of the lower conveyor 2 and all of its related mechanism to be described below may be rotated 90° in FIG. 1 to provide the upper conveyor 1, so that such conveyors may be constructed identical to each other or very close to being identical to each other. While the left-hand side wall 21 is of less vertical extent than the right-hand side wall 21, it is contemplated that the left-hand portion of the upper conveyor 1 may be cut off flush with the left-hand portion of the plug 6 so that the left-hand side wall 21 may be of the same height as the right-hand side wall 21, and in fact identical. With such a modification, the only difference between the upper conveyor 1 and the structure attached to it and the lower conveyor 2 and the structure attached to it would be the existence of the plug 6, which could easily be a plate or hollow extrusion welded or otherwise secured to the conveyor 1. Therefore, a description of one side wall 21, its mounting structure, and its side shifting structure will suffice since the other corresponding structure shown in FIG. 1 will be identical or quite similar.

Each slat of the conveyor 2 is provided with one separate side wall 21. The side wall 21 is constructed of sheet steel bent into the configuration shown in FIG. 1 with a vertical portion 22 and a horizontal portion 23. The length of the side wall 21, as measured in the molding direction perpendicular to FIG. 1 and extending vertically in FIG. 2, is identical to the corresponding length of and overlies its slat of the conveyor 2, so that within the molding tunnel the vertical portions 22 will effectively form a continuous vertical side wall in the same manner that the slats of the conveyor 2 will form a continuous horizontal bottom wall for the molding tunnel. For each of the side walls 21, there are provided two bent sheet metal braces 24 having a vertically extending leg 25 welded to the top surface of the horizontal portion 23 of the side wall, and a brace leg 26 having its end 27 welded to the vertical portion 22 of the side wall, which will allow the side wall vertical portion 22 to resist the considerable bending moments produced by the 3 to 5 psi. pressure within the molding tunnel produced by the foam 7. A rectangular opening 28 is cut out of the horizontal portion 23 of the side wall beneath each of the legs 26. An abutment 29 preferably of steel, may be welded to the slat of the conveyor 2 so as to extend upwardly through each of the openings 28; alternatively, the abutment 29 may be formed by striking out and bending upwardly a tab from the sheet metal used to construct the slat of the conveyor 2. A guide pin 30 may be welded to the abutment 29 to extend horizontally away from the abutment 29 toward the leg 25; alternatively, a portion of the abutment 29 may be struck out and bent as a tab from the sheet metal of the abutment 29 to form the guide pin 30. A compression coil spring 31 is assembled to surround the guide pin 30 and extend in compression between the leg 25 and abutment 29 so as to bias the side wall 21 away from the center of the molding tunnel. In addition, the abutment 29 extending through the opening 28 provides the limits of sliding lost motion of the side wall 21 with respect to the conveyor 2 towards and away from the molding tunnel.

For each of the side walls 21 and between the two openings 28, there is formed a single elongated slot 32 through the horizontal portion 23 of the side wall 21. An enlarged head of bolt 33 overlies a slot 32 and the shank of the bold 33 extends through the slot 32 and through a bore 34 in the conveyor 2, so that the lower threaded end of the shank may have assembled on it two lock nuts 35. The width of the slot 31 is slightly larger than the diameter of the shank 33, the diameter of the bore 34 is equal to or slightly larger than the diameter of the shank 33, and the length of the slot 31 substantially equal to or larger and corresponds to the amount of lost motion provided by the abutments 29 and openings 28. The purpose of this structure is to provide for the above-mentioned sliding lost motion between the side wall 21 and conveyor 2 towards and away from the molding tunnel, while preventing any substantial amount of vertical movement, as seen in FIG. 1, between the side wall 21 and conveyor belt 2. It is contemplated that the shank 33 could be threaded directly into a threaded hole within the conveyor 2, welded to it, or provided with a force fit. Also, more than one bolt-slot arrangement could be provided for each of the side walls 21.

A bearing strip 36 of hardened steel, that is steel considerably harder than and having greater wear resistance than the steel from which the side wall 21 is constructed, is welded or otherwise secured to the outer longitudinal edge of horizontal portion 23 of the side wall. The bearing strip 36 is of substantially the same length, in the molding direction, as the side wall to which it is secured. Each of the bearing strips 36 is in engagement with a flight of rollers 37, at least along the length of the molding tunnel. Along the return run of the conveyor belts 1 and 2 (not shown) there is no need to have any rollers in engagement with the bearing strips 36. A stationary mounting rail 38 has a plurality of slots 39, which are preferably regularly spaced 4 inches away from each other and aligned in a straight line parallel to the conveying direction. One roller 37 is mounted to overlie each of the slots 39 by a bolt 40 having a head 41, washer 42 and lock nuts 43. The rollers 37 may be of any construction, and by way of example they may be rollers as shown in U.S. Pat. No. 3,881,789 issued May 6, 1975 to Andrew T. Kornylak. For wear purposes, it would be preferable to have the rollers 37 with a steel outer rolling contact surface.

OPERATION

With the conveyors 1 and 2 being driven in the same direction, with respect to their adjacent runs as shown in FIG. 1, and at the same speed, the paper 3-5 is unrolled from a supply roll (not shown) onto the conveyor 2, and to facilitate this, the paper may be creased at the corners where the side walls 21 join the conveyor 2. The foamable mixture of synthetic resin is layed down on the wet portion 5 of the paper and either continues or begins its foaming. If the conveyors 1 and 2 are not already in their final vertical spacing from each other that will be retained throughout the length of the molding tunnel, they are brought into such final spacing. The rollers 37, as mentioned above, may be adjusted toward and away from the molding tunnel by loosening, moving, and tightening the lock nuts 43. The adjustment of these rollers is made so that after the conveyors 1 and 2, foamable resin 7 and paper 3-5 are in their proper positions, the conveyor 2 will drive the bearing strip 36 into engagement with rollers 37 adjusted so that such rollers 37 will cam the side walls 21 into engagement with the plug 6 to clamp therebetween the legs 3 and 4 of the paper. This initial clamping position will be fixed as determined by the adjustment of the rollers, and generally will remain unchanged unless conditions are changed within the apparatus or its operation that would require a readjustment of the rollers, such as a different mixture of foaming ingredients, or a different height of final product 7.

Prior to clamping, the amount of paper 3-5 placed into the molding tunnel may be the exact amount required, but preferably it will be controlled so as to be less than the amount required.

With movement of the conveyors, the now foaming material 7 will expand as it moves through the molding tunnel with the conveyors to where it finally fills the cavity formed by the plug 6 and paper 3-5, which condition is represented in FIG. 4 when less than the required amount of paper has been clamped within the molding tunnel. Before this point is reached or slightly after this point is reached, the guide strip 36 of the side wall will engage a portion of the flight of rollers 37' that have been adjusted away from the molding tunnel by a small amount so that the paper legs 3, 4 are unclamped and free to move further into the molding tunnel under the forces created by the weight and/or pressure of the foam carried within the trough created by the paper. In FIG. 2, this unclamping has been exaggerated for purposes of illustration and it is preferable that the unclamping be very slight and only sufficient to permit movement of the paper legs 3, 4 between the side walls 21 and plug 6. In this manner, leakage is prevented since if the side walls were unclamped too far leakage might occur. Further, leakage is prevented by the actual movement of the paper legs 3, 4 into the molding tunnel that would tend to sweep any adjacent rising foam into the tunnel rather than through the gap as leakage.

The unclamping would only be for a very brief period of time either just sufficient to permit the paper to move from the position of FIG. 4 to the position of FIG. 1, or to move part way to such position. Although longer unclamping and release of the paper is possible and in some cases permittable, it is undesirable in that it increases the chances of leakage. The movement of the paper from its position of FIG. 4 to its position of FIG. 1 may be accomplished in a plurality of steps as determined by corresponding plurality of clamp and release cycles. Although the unclamping, for any particular cycle, may be shortly after the foam has completely filled the space provided by the paper and plug 6, it is not desirable to wait too long since pressures of 3 to 5 psi. are built up with the rising foam and they might rupture the paper adjacent to the space 8 in FIG. 4 if unclamping is delayed for too long a period of time.

After there have been a sufficient number of cycles of clamping and releasing the paper with rising of the foam so as to reach the condition in FIG. 1 wherein the paper smoothly and tightly engages the side walls 21 and conveyor 2 with the foam completely filling the space between the plug 6 and paper, there is no need for any further unclamping and the rollers will maintain the side walls clamped throughout the remainder of the molding tunnel during curing of the foam. As an alternative, a mechanism (not shown) could be employed to latch or clamp the side walls 21 to the conveyors 1 and 2, to avoid the necessity of further rollers. In any event, after the foam 7 has been cured, the side walls 21 will be moved away from the plug 6 to unclamp the paper and product, so that the conveyors 1 and 2 may move away from each other to permit withdrawal, cutting and removal of the final product.

While a preferred embodiment of the mechanism for clamping and unclamping the side walls has been shown for purposes of illustration and the desirability of its details, further means for accomplishing this function are contemplated. For example, the flight of rollers 37 and the bearing strip 36 could be replaced with one or more aligned aperatures through each horizontal plate 23 and its adjacent conveyor slat, a vertically moving wedge could be driven into these apertures to cam the side wall 21 into engagement with the plug 6 under the force of either a spring or a solenoid, for example, with release being effected by the solenoid withdrawing the wedge, or a cam track withdrawing the wedge together with the spring 31 withdrawing the side wall 21. Alternatively, the relationship of the compression spring 31 could be changed so that it would force the side wall 21 into engagement with the plug 6 and the wedges or cams could be provided to move it out of engagement.

Further embodiments, modifications and variations of the disclosed invention are contemplated, all according to the spirit and scope of the following claims.

What is claimed:

1. A method of continuously producing a cured sheet of foam resin, comprising the steps of:

providing a closed mold formed by opposed upper and lower parallel endless conveyor belts having adjacent portions driven in a common molding direction and being held in spaced parallel relationship with respect to each other to respectively form the upper and lower mold surfaces, and further by providing side walls for the mold to close the mold and close the spaces between said upper and lower conveyor belts, with the side walls being driven at the same speed as the conveyor belts in the molding direction;

providing a flexible cover sheet extending over the face of one of said conveyor belts that forms said mold and over the face of one of said side walls that form said mold, and with the cover sheet being of indefinite length with one longitudinal edge portion extending in the mold direction and extending out of the mold between the one side wall and the other of said conveyor belts;

depositing a mixture of foamable chemicals at the upstream entrance end of said mold on one of said conveyor belts so as to move through a first expansion zone of said mold as it rises to fill the mold and thereafter move through a curing zone of said mold to cure into the foamed product that will exit at the downstream end of said mold;

moving said one side wall and other conveyor belt into engagement to clamp there between the longitudinal edge portion of said cover sheet to prevent leakage of the expanding foamable material between said cover sheet and said other conveyor where the cover sheet is clamped;

thereafter moving said one side wall and other conveyor belt away from each other to thereby unclamp the longitudinal edge portion of said cover sheet at least within a portion of said expansion zone so that the forces produce by the expanding foamable mixture against the cover sheet may move the cover sheet into close conformity with the adjacent surfaces of the one conveyor belt and one side wall, if needed, while the cover sheet is unclamped and free to move transversely of the molding direction between the other conveyor belt and one side wall while providing a sufficiently close spacing between said other conveyor belt and one side wall to prevent substantial leakage of the expanding mixture from the mold; thereafter moving said one side wall and said other conveyor belt toward each other to reclamp the longitudinal edge portion of said cover sheet between said one side wall and said other conveyor to thereby prevent leakage from between said other conveyor belt and said one side wall, with said unclamping and reclamping being performed with said mold being substantially entirely filled with the expanding mixture at least in a portion of said mold adjacent the unclamped longitudinal edge of said cover sheet; and curing the mixture within the curing portion of said mold.

2. The method of claim 1, wherein said steps of providing the cover sheet and clamping the cover sheet provide an insufficient amount of the cover sheet into the mold to completely conform to and engage all of the adjacent surfaces of said one conveyor belt and said one side wall.

3. The method of claim 2, wherein said unclamping and reclamping are sequentially repeated along the length of said mold before the completion of the curing.

4. The method of claim 3, wherein said cover sheet extends along and covers the faces of both of said side walls and the entire face of said one conveyor belt to thereby form a moving trough, with said one conveyor belt being the lower conveyor belt so that said trough is substantially U-shaped and extends upwardly so as to receive therein the foamable material when deposited, and said clamping, unclamping, and reclamping conducted with respect to both said side walls along the opposite longitudinal edge portions of said cover sheet.

5. The method of claim 4, wherein said unclamping and reclamping are sequentially repeated along the length of said mold before curing.

6. The method of claim 5, wherein said unclamping and reclamping are sequentially repeated along the length of said mold before curing.

* * * * *